(12) United States Patent
Castillo

(10) Patent No.: US 10,508,913 B2
(45) Date of Patent: Dec. 17, 2019

(54) ENVIRONMENT RECORDING SYSTEM USING VIRTUAL OR AUGMENTED REALITY

(71) Applicant: Raytheon Company, Waltham, MA (US)

(72) Inventor: Nicholas M. Castillo, Tucson, AZ (US)

(73) Assignee: Raytheon Company, Waltham, MA (US)

(*) Notice: Subject to any disclaimer, the term of this patent is extended or adjusted under 35 U.S.C. 154(b) by 1 day.

(21) Appl. No.: 15/891,900

(22) Filed: Feb. 8, 2018

(65) Prior Publication Data
US 2019/0242705 A1 Aug. 8, 2019

(51) Int. Cl.
| | |
|---|---|
| G01C 11/02 | (2006.01) |
| G06T 19/00 | (2011.01) |
| G06K 9/00 | (2006.01) |
| G06T 7/73 | (2017.01) |
| G06F 3/01 | (2006.01) |

(52) U.S. Cl.
CPC ............ *G01C 11/025* (2013.01); *G06F 3/011* (2013.01); *G06K 9/00671* (2013.01); *G06T 7/73* (2017.01); *G06T 19/006* (2013.01); *G06T 2200/04* (2013.01); *G06T 2200/08* (2013.01); *G06T 2215/16* (2013.01)

(58) Field of Classification Search
None
See application file for complete search history.

(56) References Cited

U.S. PATENT DOCUMENTS

| | | | | |
|---|---|---|---|---|
| 9,159,166 | B2 | 10/2015 | Finn et al. | |
| 2005/0223337 | A1* | 10/2005 | Wheeler | G06F 3/04845 715/806 |
| 2012/0237085 | A1* | 9/2012 | Meier | G06K 9/3216 382/103 |
| 2016/0011842 | A1* | 1/2016 | Hsieh | G06F 3/1438 345/173 |
| 2018/0239840 | A1* | 8/2018 | Santarone | G06F 17/5004 |

* cited by examiner

*Primary Examiner* — Yanna Wu
(74) *Attorney, Agent, or Firm* — Schwegman Lundberg & Woessner, P.A.

(57) ABSTRACT

A system receives data from a laser scanning device, a photogrammetric device, or similar data capture device. The data relate to an environment in a first state. The system generates a point cloud of the environment in the first state using the data, and provides the point cloud as input to a gaming engine. Output from the gaming engine is provided to an augmented reality, a virtual reality, or a mixed reality application. The system then generates a view of the environment in a second state using the augmented reality, virtual reality, or mixed reality application.

9 Claims, 4 Drawing Sheets

ENVIRONMENT RECORDING SYSTEM USING VIRTUAL OR AUGMENTED REALITY

TECHNICAL FIELD

The present disclosure relates to virtual and augmented reality, and in an embodiment, but not by way of limitation, a system that combines laser scanning or a similar technology and virtual, augmented, or mixed reality to record and store data from an environment in a first state and thereafter overlay the data from the first state onto a current state of the environment.

BACKGROUND

In certain environments, once the environment is modified or changed, the previous environment is potentially lost forever, either because the environment has been covered up or the environment has been altered in some manner. For example, once a wall in a building is covered with sheetrock, or concrete is poured over rebar and other structures, one can no longer see what is inside the wall (conduits, studs, wires, etc.) or the concrete pad (rebar, conduit, piping, etc.) without some sort of destructive or invasive action. Facilities and inspectors can only guess and rely on drawings (e.g., blueprints), which are usually notional, and simply not an accurate as-built condition. There is therefore a problem in determining where to cut into the wall or concrete to access the contents in the wall or concrete with any sort of accuracy. This is the case irrespective of whether one wants to pinpoint exactly the object that one is looking for so as to work on that object or whether one wants to simply avoid the object and not do any damage to the object. Accessing or avoiding such objects in such a covered, unknown space is very difficult, time consuming, and very much a guessing game.

DETAILED DESCRIPTION

Figure 1:
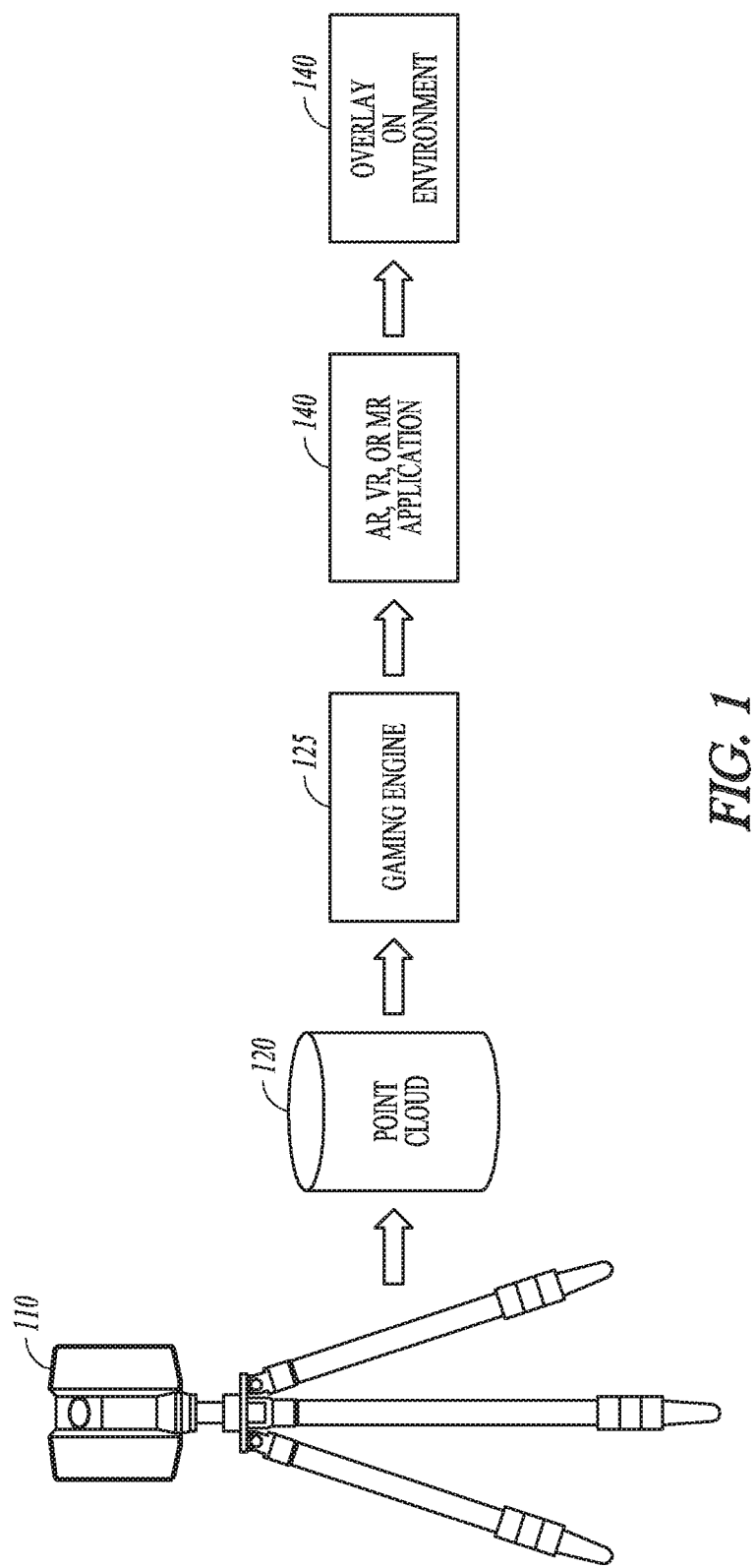
FIG. 1 is a diagram of an environment recording system for creating a representation, which can be referred to as a virtual x-ray, using a laser scanner and one or more of a virtual reality, augmented reality, and mixed reality application.

In the following description, for purposes of explanation, numerous specific details are set forth in order to provide a thorough understanding of the various aspects of different embodiments of the present invention. It will be evident, however, to one skilled in the art that the present invention may be practiced without all the specific details and/or with variations, permutations, and combinations of the various features and elements described herein.

An embodiment provides a system and method to combine laser scanning or similar technology with augmented, virtual, or mixed reality to record and store data from an environment in a first state, and thereafter overlay the data from the first state onto a real-world view of the current state of the environment using the augmented, virtual, or mixed reality application. The system and method receive and record data from a laser scanning device, a photogrammetric device, or other similar data capture device. The data relate to an environment in a first state, such as an unfinished wall in a building or a crime scene before it is cleaned up. The system and method generate a point cloud of the environment in the first state using the data. The system and method then provide the point cloud as input to a gaming engine, and output from the gaming engine is provided to an augmented reality, a virtual reality, or a mixed reality application. The augmented reality, virtual reality, or mixed reality application generates a view of the environment in a second state by creating a view of the environment in the first state to be overlaid on a view of the environment in the second state. For example, the environment in the second view may be the wall in a building, and the overlay on the wall may be a virtual reality view of the wall with the innards of the wall being overlaid on the wall. In short, the system and method solve issues with unknown infrastructures and systems that are hidden inside of walls, floors, and ceilings. The system and method also permit the re-creation of a scene from a prior time, such as a crime scene before it was cleaned up.

The system of a laser scanning augmented reality tool provides a new, intuitive way to solve problems within construction, allowing a unique perspective into a normal process that is flawed. Gaining insight into places that one would normally no longer be able to access helps gain confidence before embarking on a modification of the environment or structure. As noted, the laser scanning augmented reality tool also can be used in accident reviews, dropped hardware, slips, trips, and falls. For example, any broken equipment from an environment or scene can be scanned and then reviewed later, at the investigator's convenience, at any time, with the augmented reality, virtual reality, or mixed reality overlay on a real-world view. This permits a full study of what occurred, and solutions can be created and tested in augmented, virtual, and mixed reality.

In an embodiment, terrestrial laser scanning is used to scan the contents of a wall, concrete pad, or other environment to accurately identify all contents and infrastructure before the sheet rock is put up, the concrete is poured, or the environment is modified in some manner. In another embodiment, a photogrammetric device or other similar technological device can be used. After the laser scan is post-processed, a native point cloud, which can include layers of clip planes, or a 3D model, which similarly can include layers of clip planes, can be used with virtual reality (VR), augmented reality (AR), and/or mixed reality (MR) application software to look into (that is, a sort of a virtual x-ray) the existing wall using a smartphone, a tablet, or an AR, a VR, or an MR headset. It is noted that use of a 3D model may not be as accurate, since a 3D model is based on 90 degree views of objects and structures. Consequently, a 3D model may only be used in predictions of future states of environments. The AR, VR, or MR view is overlaid onto a current view of the existing wall or concrete pad so that the user can see what is embedded in the wall or concrete. Facilities, inspectors, construction crews, and/or planners can use the AR, VR, or MR view to accurately (e.g., within 2 mm) identify what is otherwise unseen in the wall. Embodiments combine the accuracy of laser scanning and the real-world application of AR, VR, or MR to create a solution for identifying objects behind walls or concrete pads, or to preserve and re-create different scenes or environments.

In an embodiment, an end user would wear a wearable backpack computer (e.g., MSI VR1 or HP One) in conjunction with an AR, a VR, or an MR Headset (e.g., Microsoft Hololens, Meta, Daqri, ODG) and look at a real-world wall, floor, or other structure or environment with overlaid color laser scan data being oriented with markerless tracking (that is, marks do not have to be placed on structures when data are acquired via the laser scan) as established with scan and acquire techniques used by software like Hololens, Ngrain, or Simultaneous Localization and Mapping (SLAM) to gather data in real time. For example, SLAM software maps an environment, such as a room, by treating walls and objects in the room as planes, and locks in coordinates in the environment, thereby linking the laser scan data with the real-world. This allows the user to peer into the walls or floors and see what is inside them. Conduit, rebar, stud placement, HVAC equipment, and other objects or structures are revealed and instantly provide the end user with the information needed to determine at what location to drill, cut, or work without damaging the internal objects.

FIG. 1 illustrates an embodiment of an environment recording system that uses AR, VR, or MR. In the embodiment of FIG. 1, a laser scanner 110 is used to gather data from an environment. As previously noted, a photogrammetric device or other similar technological device could also be used. Such an environment can be, for example, an unfinished wall in a building. In an embodiment, a terrestrial laser scanner can be used. Such a terrestrial scanner is fast and portable. The terrestrial scanner is a non-contact 3D measurement system that digitally documents the location of an object's outer surface and details as-built or as-is conditions. The terrestrial scanner can generate a 360° horizontal field of view and a 320° vertical field of view, and has a scan rate of up to 900,000 points/second. The terrestrial scanner measures the distance to objects by laser pulses that are reflected back to the scanner, so that the distance to the objects is defined by their relative vertical and horizontal positions. This process is repeated until a full 3D representation of the object or area is achieved. The scanned data are used to generate a point cloud 120. The point cloud 120 is provided to a gaming engine 125, and the output of the gaming engine is provided to an AR, a VR, or a MR application 130 executing on a processor. The AR, VR, or MR application uses the point cloud data to generate an overlay 140, which includes representations of objects and structures captured by the laser scan, to be used on a real-world view of the environment at a later time when the environment is at a later state and/or in a different condition.

Figure 3A:
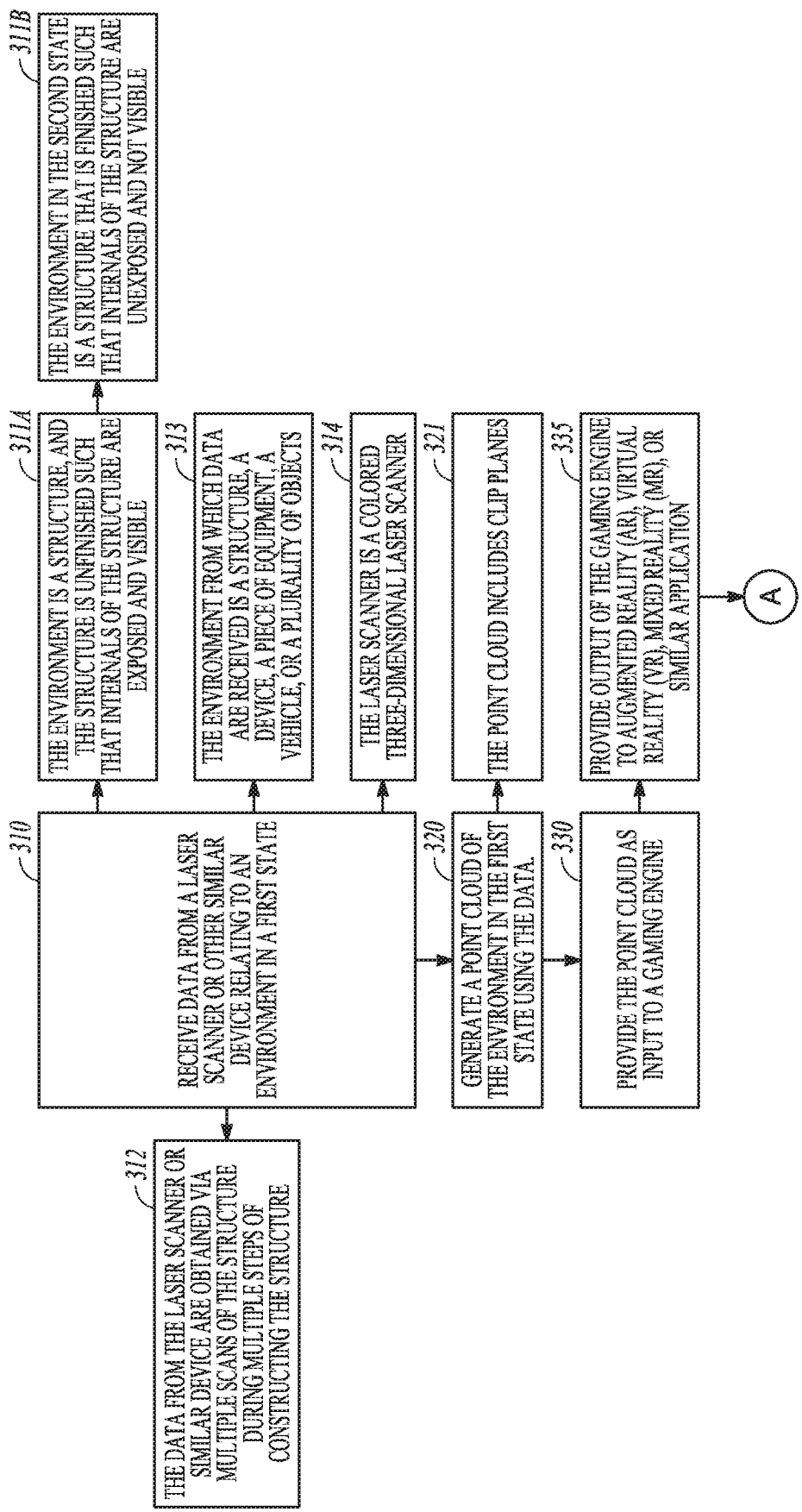
FIGS. 3A and 3B are a block diagram illustrating processes and features of an environment recording system that combines laser scanning or similar technology with an augmented reality, virtual reality, or mixed reality application.
Figure 3B:
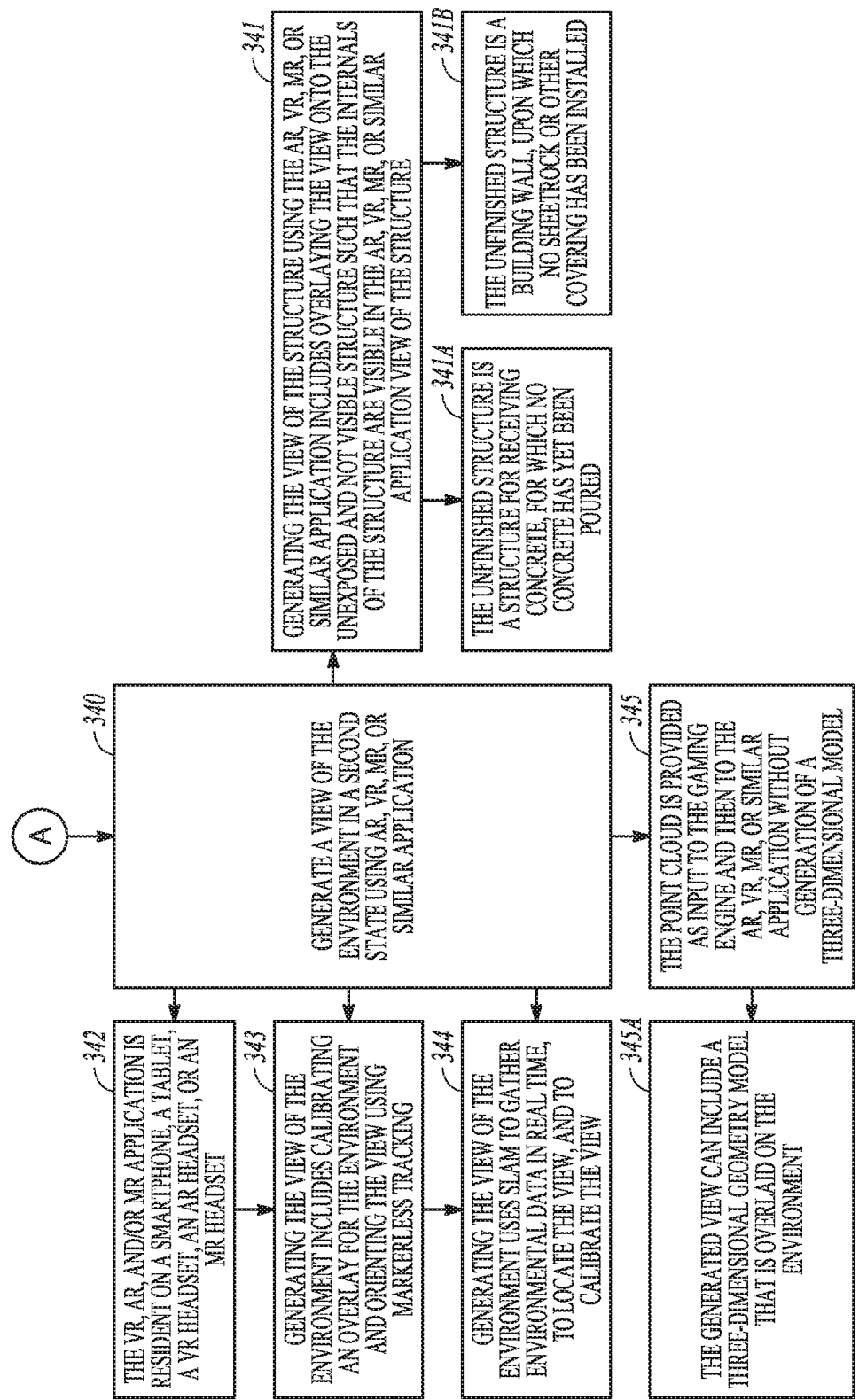

FIGS. 3A and 3B are a block diagram illustrating an example method and system of using a laser scanning device, a photogrammetric device, or other similar technological device, and one or more of an AR, a VR, or an MR application, to create an overlay of an environment in a first condition to be used in an AR, a VR, or an MR representation of the environment in a later condition. As noted, this can be referred to as a virtual x-ray. FIGS. 3A and 3B include a number of process blocks 310-345A. Though arranged somewhat serially in the example of FIGS. 3A and 3B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIGS. 3A and 3B, a system to record an environment in two or more states using laser scanning or a similar technology, and then to overlay the one state upon an AR, a VR, or an MR view of another state, receives at 310 into a computer processor and a computer memory data from a laser scanning device, a photogrammetric device, or other similar technological device. At this point, the data relate to the environment in a first state. For example, as alluded to elsewhere in this disclosure, the first state of an environment can be an unfinished wall in a building, wherein electrical wiring, pipes, conduits, and other features or objects are visible within the unfinished wall. As indicated at 314, when a laser scanning device is used, the laser scanning device can be a colored three-dimensional laser scanning device. An advantage of using a colored three-dimensional laser scanning device is that objects are more easily recognizable.

Figure 2:
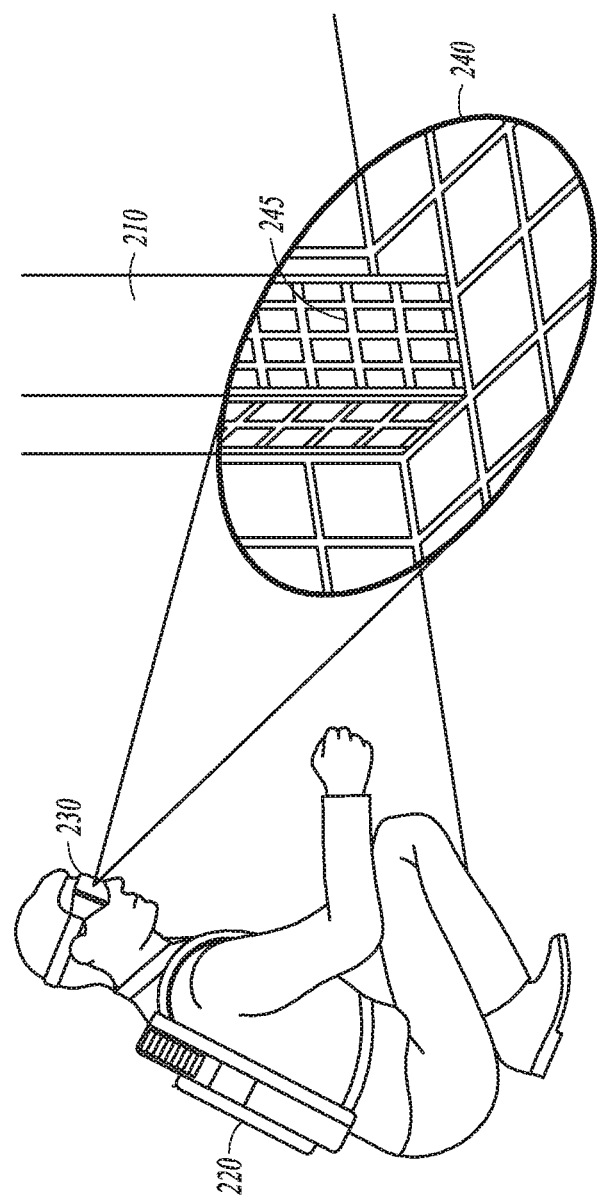
FIG. 2 illustrates an application of the system of FIG. 1.

At 320, the system generates a point cloud of the environment in the first state using the data. At 330, the system provides the point cloud as input to a gaming engine, and at 335, output from the gaming engine is provided to an augmented reality (AR), virtual reality (VR), mixed reality (MR), or similar application. At 340, the AR, VR, or MR application generates a view of the environment in a second state using the AR, VR, or MR application. An example of such a view is illustrated in FIG. 2. In FIG. 2, an AR, a VR, or an MR system is contained within a wearable pack 220, and an AR, a VR, or an MR headset 230 generates an overlay 240 that permits the user to view the internals 245 of a structure behind a wall 210, that is, a virtual x-ray.

As noted above in connection with operation 310, the collected data relate to the environment in a first state. As indicated in operation 311A, the environment can be a building or other structure, and in such instances, the building or structure is unfinished such that internals of the building or structure are exposed and visible. At operation 311B, the environment in the second state can be a building or other structure that is finished such that internals of the structure are unexposed and not visible. As further indicated as 312, the data from the laser scanning device, photogrammetric device, or similar device are obtained via multiple scans of the structure during multiple steps of constructing the structure. In this manner, internals that are present at different depths within the structure, and which may be obscured by later installed internals, can be captured in their entirety and without being blocked by any later-installed internals.

At 341, the generation of the view of the structure using the augmented reality, virtual reality, or mixed reality application comprises overlaying the view onto the unexposed and not visible structure such that the internals of the structure are visible in the augmented reality, virtual reality, or mixed reality view of the structure. As indicated at 341A, the unfinished structure can be a structure for receiving concrete, for which no concrete has yet been poured. In such an unfinished structure, the exposed internals can include such fixtures or objects as rebar, conduits, and drainage pipes. As indicated at 341B, the unfinished structure can be a building wall, upon which no sheetrock or other covering has been installed. In such an unfinished structure, the exposed materials can include electrical wiring and components, duct work, and pipes.

As illustrated at 321, the point cloud can include clip planes. Clip planes in an embodiment isolate and record a particular section-depth of the structure or environment. For example, when recording the internals of a wall, the pertinent clip plane may encompass a depth of a meter, so that only the internals of the wall and any structures immediately behind the wall are captured, and not any other parts of the building beyond that.

As indicated at 342, the AR, VR, or MR application can be resident on a smartphone, a tablet, a virtual reality headset, an augmented reality headset, or a mixed reality headset. As noted previously, the use of an AR, a VR, or an MR headset is illustrated in FIG. 2.

At 343, the generation of the view of the environment includes calibrating an overlay for the environment and orienting the view using markerless tracking. In prior systems, markers were placed on the internals of the structure, and these markers were used to generate a three-dimensional model. The generated three-dimensional model was then used in connection with a virtual reality application. In contrast, no markers are used in markerless tracking, and the laser scan or similar technology captures the presence of the internals for the point cloud without the use of markers. Consequently, no markers are used, no three-dimensional model is generated, and the point cloud data are provided directly to the gaming engine and then to the AR, VR, or MR application. Similarly, in connection with the use of markerless tracking, as indicated at 344, the generation of the view of the environment uses simultaneous localization and mapping (SLAM) to gather environmental data in real time, to locate the view, and to calibrate the view.

As indicated at 313, the environment from which data can be received could be a structure, a device, a piece of equipment, a vehicle, or a plurality of objects. For example, a scan could be taken of an automobile that has been damaged in an accident, and after the vehicle is repaired, the AR, VR, or MR data could be overlaid on the repaired vehicle if the damage had to be viewed again after the repair. As another example, a scan could be taken of a crime scene, such as if a place of business was broken into and vandalized. Before the crime scene was cleaned up, a scan of the scene could be taken and the point cloud data obtained therefrom could later be overlaid on a cleaned-up, current view of the business premises.

As indicated at 345, the point cloud is provided as input to the gaming engine and then to the AR, VR, or MR application without generation of a three-dimensional model. There is an advantage to providing raw, point cloud data directly to an AR, a VR, or an MR application, that is, without first converting it to a 3D model before providing it to the AR, VR, or MR application. When laser scan or point cloud data are turned into a 3D model, small changes are made to the data to make it more compatible to a CAD environment. These changes result in a discrepancy between the actual environment and the 3D model. In contrast, there is no alteration to the raw point cloud data to make it compatible for a CAD environment, and the use of the raw point cloud data results in a more accurate depiction of the environment. Notwithstanding the foregoing, as further indicated at 345A, the AR, VR, or MR application can thereafter generate a view that includes a three-dimensional geometry model that is overlaid on the environment. While as indicated above an advantage of the present disclosure over prior systems is that point cloud data are provided directly to a gaming engine and then to an AR, a VR, or an MR application without first conversion to a 3D model, in some embodiments, there may be a reason to use a three-dimensional model.

Example Embodiments

Example No. 1 is a process that includes receiving into a computer processor and a computer memory data from a laser scanning device or a photogrammetric device, wherein the data relate to an environment in a first state; generating a point cloud of the environment in the first state using the data; providing the point cloud as input to gaming engine; providing output from the gaming engine to an augmented reality, a virtual reality, or a mixed reality application; and generating a view of the environment in a second state using the augmented reality, virtual reality, or mixed reality application.

Example No. 2 includes the features of Example No. 1, and optionally includes the features wherein the environment includes a structure, and wherein the environment in the first state includes a structure that is unfinished such that internals of the structure are exposed and visible, and wherein the environment in the second state includes a structure that is finished such that internals of the structure are unexposed and not visible.

Example No. 3 includes the features of Examples Nos. 1-2, and optionally includes features wherein the generating the view of the structure using the augmented reality, virtual reality, or mixed reality application includes overlaying the view onto the unexposed and not structure such that the internals of the structure are visible in the augmented reality, virtual reality, or mixed reality view of the structure.

Example No. 4 includes the features of Examples Nos. 1-3, and optionally includes features wherein the unfinished structure includes a structure for receiving concrete, wherein the concrete has not been poured.

Example No. 5 includes the features of Examples Nos. 1-4, and optionally includes features wherein the unfinished structure comprises a wall wherein sheetrock or other covering has not been installed.

Example No. 6 includes the features of Examples Nos. 1-5, and optionally includes features wherein the point cloud comprises clip planes.

Example No. 7 includes the features of Examples Nos. 1-6, and optionally includes features wherein the augmented reality, virtual reality, or mixed reality application is resident on a smartphone, a tablet, a virtual reality headset, an augmented reality headset, a virtual reality headset, or a mixed reality headset.

Example No. 8 includes the features of Examples Nos. 1-7, and optionally includes features wherein the generating the view of the environment includes calibrating an overlay for the environment and orienting the view using markerless tracking.

Example No. 9 includes the features of Examples Nos. 1-8, and optionally includes features wherein the generating the view of the environment uses simultaneous localization and mapping (SLAM) to gather environmental data in real time, to locate the view, and to calibrate the view.

Example No. 10 includes the features of Examples Nos. 1-9, and optionally includes features wherein the data from the laser scanning device or the photogrammetric device are obtained via multiple scans of the structure during multiple steps of constructing the structure.

Example No. 11 includes the features of Examples Nos. 1-10, and optionally includes features wherein both the augmented reality application and the virtual reality application are used in the mixed reality application.

Example No. 12 includes the features of Examples Nos. 1-11, and optionally includes features wherein the environment includes a structure, a device, a piece of equipment, or a plurality of objects.

Example No. 13 includes the features of Examples Nos. 1-12, and optionally includes features wherein the plurality of objects includes objects from a crime scene, and wherein the view is generated after the crime scene has been cleaned up.

Example No. 14 includes the features of Examples Nos. 1-13, and optionally includes features wherein the view includes a three-dimensional geometry model overlaid on the environment.

Example No. 15 includes the features of Examples Nos. 1-14, and optionally includes features wherein the point cloud is provided as input to the augmented reality, virtual reality, or mixed reality application without generation of a three-dimensional model.

Example No. 16 includes the features of Examples Nos. 1-15, and optionally includes features wherein the laser scanning device includes a colored three-dimensional laser scanning device.

Example No. 17 is a computer readable medium including instructions that when executed by a processor executes a process including receiving into a computer processor and a computer memory data from a laser scanning device or a photogrammetric device, wherein the data relate to an environment in a first state; generating a point cloud of the environment in the first state using the data; providing the point cloud as input to gaming engine; providing output from the gaming engine to an augmented reality, a virtual reality, or a mixed reality application; and generating a view of the environment in a second state using the augmented reality, virtual reality, or mixed reality application.

Example No. 18 includes the features of Example No. 17, and optionally includes features wherein the environment includes a structure, and wherein the environment in the first state includes a structure that is unfinished such that internals of the structure are exposed and visible, and wherein the environment in the second state includes a structure that is finished such that internals of the structure are unexposed and not visible; and wherein the generating the view of the structure using the augmented reality, virtual reality, or mixed reality application includes overlaying the view onto the unexposed and not visible structure such that the internals of the structure are visible in the augmented reality, virtual reality, or mixed reality view of the structure.

Example No. 19 is a system including a computer processor; a computer memory coupled to the computer processor; and a laser scanning device or a photogrammetric device coupled to one or more of the computer processor and the computer readable medium; wherein the system is operable for receiving into a computer processor and a computer memory data from a laser scanning device or a photogrammetric device, wherein the data relate to an environment in a first state; generating a point cloud of the environment in the first state using the data; providing the point cloud as input to gaming engine; providing output from the gaming engine to an augmented reality, a virtual reality, or a mixed reality application; and generating a view of the environment in a second state using the augmented reality, virtual reality, or mixed reality application.

Example No. 20 includes the features of Example No. 19, and optionally includes features wherein the generating the view of the environment includes calibrating an overlay for the environment and orienting the view using markerless tracking, or wherein the generating the view of the environment uses simultaneous localization and mapping (SLAM) to gather environmental data in real time, to locate the view, and to calibrate the view.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A process comprising:
   receiving into a computer processor and a computer memory data from a laser scanning device or a photogrammetric device, wherein the data relate to an environment in a first state;
   generating a point cloud of the environment in the first state using the data;
   providing the point cloud as input to a gaming engine, thereby generating as output a view of the point cloud of the environment in the first state;
   providing the view of the point cloud of the environment in the first state outputted from the gaming engine to an augmented reality, a virtual reality, or a mixed reality application;
   generating a view of the environment in a second state; and
   generating an augmented reality, a virtual reality, or a mixed reality view of the environment by providing the view of the environment in the second state to the augmented reality, the virtual reality, or the mixed reality application and overlaying the view of the point cloud of the environment in the first state onto the view of the environment in the second state and orienting the view of the point cloud of the environment in the first state and the view of the environment in the second state using markerless tracking and real time data gathered by using a simultaneous localization and mapping (SLAM) technique;
   wherein the point cloud is provided as input to the game engine and the view of the point cloud of the environment in the first state is provided to the augmented reality, the virtual reality, or the mixed reality application without generation of any three-dimensional model; and
   wherein the environment comprises a structure, and wherein the view of the point cloud of the environment in the first state comprises the structure that is unfinished such that internals of the structure are exposed and visible, and wherein the view of the environment in the second state comprises the structure that is finished such that internals of the structure are unexposed and not visible.

2. The process of claim 1, wherein the structure that is unfinished comprises a structure for receiving concrete, wherein the concrete has not been poured.

3. The process of claim 1, wherein the structure that is unfinished comprises a wall wherein sheetrock or other covering has not been installed.

4. The process of claim 1, wherein the point cloud of the environment in the first state comprises clip planes.

5. The process of claim 1, wherein the augmented reality, the virtual reality, or the mixed reality application is resident on a smartphone, a tablet, a virtual reality headset, an augmented reality headset, a virtual reality headset, or a mixed reality headset.

6. The process of claim 1, wherein the data from the laser scanning device or the photogrammetric device are obtained via multiple scans of the structure during multiple steps of constructing the structure.

7. The process of claim 1, wherein the laser scanning device comprises a colored three-dimensional laser scanning device.

8. A non-transitory computer readable medium comprising instructions that when executed by a processor executes a process comprising:
   receiving into a computer processor and a computer memory data from a laser scanning device or a photogrammetric device, wherein the data relate to an environment in a first state;
   generating a point cloud of the environment in the first state using the data;
   providing the point cloud as input to a gaming engine, thereby generating as output a view of the point cloud of the environment in the first state;
   providing the view of the point cloud of the environment in the first state outputted from the gaming engine to an augmented reality, a virtual reality, or a mixed reality application;
   generating a view of the environment in a second state; and
   generating an augmented reality, a virtual reality, or a mixed reality view of the environment by providing the view of the environment in the second state to the augmented reality, the virtual reality, or the mixed reality application and overlaying the view of the point cloud of the environment in the first state onto the view of the environment in the second state and orienting the view of the point cloud of the environment in the first state and the view of the environment in the second state using markerless tracking and real time data gathered by using a simultaneous localization and mapping (SLAM) technique;
   wherein the point cloud is provided as input to the game engine and the view of the point cloud of the environment in the first state is provided to the augmented reality, the virtual reality, or the mixed reality application without generation of any three-dimensional model; and
   wherein the environment comprises a structure, and wherein the view of the point cloud of the environment in the first state comprises the structure that is unfinished such that internals of the structure are exposed and visible, and wherein the view of the environment in the second state comprises the structure that is finished such that internals of the structure are unexposed and not visible.

9. A system comprising:
   a computer processor;
   a computer memory coupled to the computer processor; and
   a laser scanning device or a photogrammetric device coupled to the computer processor and the computer memory;
   wherein the system is operable for
   receiving into the computer processor and the computer memory data from the laser scanning device or the photogrammetric device, wherein the data relate to an environment in a first state;
   generating a point cloud of the environment in the first state using the data;
   providing the point cloud as input to a gaming engine, thereby generating as output a view of the point cloud of the environment in the first state;
   providing the view of the point cloud of the environment in the first state outputted from the gaming engine to an augmented reality, a virtual reality, or a mixed reality application;
   generating a view of the environment in a second state; and
   generating an augmented reality, a virtual reality, or a mixed reality view of the environment by providing the view of the environment in the second state to the augmented reality, the virtual reality, or the mixed reality application and overlaying the view of the point cloud of the environment in the first state onto the view of the environment in the second state and orienting the view of the point cloud of the environment in the first state and the view of the environment in the second state using markerless tracking and real time data gathered by using a simultaneous localization and mapping (SLAM) technique;
   wherein the point cloud is provided as input to the game engine and the view of the point cloud of the environment in the first state is provided to the augmented reality, the virtual reality, or the mixed reality application without generation of any three-dimensional model; and
   wherein the environment comprises a structure, and wherein the view of the point cloud of the environment in the first state comprises the structure that is unfinished such that internals of the structure are exposed and visible, and wherein the view of the environment in the second state comprises the structure that is finished such that internals of the structure are unexposed and not visible.

* * * * *

UNITED STATES PATENT AND TRADEMARK OFFICE
CERTIFICATE OF CORRECTION

PATENT NO. : 10,508,913 B2
APPLICATION NO. : 15/891900
DATED : December 17, 2019
INVENTOR(S) : Nicholas M. Castillo Page 1 of 1

It is certified that error appears in the above-identified patent and that said Letters Patent is hereby corrected as shown below:

On the Title Page

In item (57), in "Abstract", in Column 2, Line 6, delete "gaining" and insert --gaming-- therefor In the Specification In Column 6, Line 23, after "not", insert --visible--

Signed and Sealed this
Fourth Day of August, 2020

Andrei Iancu
*Director of the United States Patent and Trademark Office*